(12) United States Patent
Swaminathan (10) Patent No.: US 12,327,449 B2
(45) Date of Patent: Jun. 10, 2025

(54) VIRTUAL IDENTIFICATION FOR GRANTING SECURE ACCESS USING TWO FORMS OF AUTHENTICATION

(71) Applicant: Truist Bank, Charlotte, NC (US)

(72) Inventor: Sudhakar Swaminathan, Johns Creek, GA (US)

(73) Assignee: Truist Bank, Charlotte, NC (US)

( * ) Notice: Subject to any disclaimer, the term of this patent is extended or adjusted under 35 U.S.C. 154(b) by 231 days.

(21) Appl. No.: 18/045,931

(22) Filed: Oct. 12, 2022

(65) Prior Publication Data

US 2024/0127645 A1  Apr. 18, 2024

(51) Int. Cl.
*G07C 9/25* (2020.01)
*G07C 9/00* (2020.01)
*H04B 5/72* (2024.01)
*H04L 9/32* (2006.01)

(52) U.S. Cl.
CPC ......... *G07C 9/00182* (2013.01); *G07C 9/257* (2020.01); *H04B 5/72* (2024.01)

(58) Field of Classification Search
CPC ...... G08B 17/06; G08B 25/003; G08B 25/04; G08B 29/18; G08B 7/06; G07C 9/00182; G07C 9/00571; G07C 9/257; G07C 2009/00769; G07C 2209/64; G07C 9/00309; G07C 9/27; G06Q 20/18; G06Q 20/20; G06Q 20/322; G06Q 20/3278; G06Q 20/3821; G06Q 20/3829; G06Q 20/401; G06Q 20/4014; G06Q 20/40145; G06Q 2230/00; G06F 21/32; H04W 12/06; H04W 4/023; H04W 4/027; H04W 4/80; H04W 88/08; H04L 63/0861; H04L 2209/56; H04L 2209/80; H04L 9/3213; H04L 9/3231; H04L 9/3239; H04L 9/3247; H04L 9/50; H04B 5/72; H04B 5/20; H04B 5/45; H04B 5/77; H04B 5/24; H03K 17/955; G06K 7/10118; G06K 7/10128;
(Continued)

(56) References Cited

U.S. PATENT DOCUMENTS

9,536,359 B1   1/2017   Gokcebay
2006/0025110 A1   2/2006   Liu
2007/0013610 A1   1/2007   Mooney
(Continued)

*Primary Examiner* — Dionne Pendleton
(74) *Attorney, Agent, or Firm* — Michael A. Springs, Esq.; Shumaker, Loop & Kendrick, LLP; Patrick B. Horne (57) ABSTRACT

A system for providing a user physical access to a facility. The system permits access to the facility via the user's mobile device that has a first near-field communication device and one or more security measures for authenticating the user's identity. A mobile application is encoded on the mobile device and is configured to create, store, and transmit a virtual identification of the user via the first near-field communication device. A reader device, having a second near-field communication device, at the facility permits physical access to the facility. The mobile application permits near-field communication between the first near-field communication device and the second near-field communication device when the mobile device and the reader device are in proximity to one another. When the mobile device authenticates the user's identity, the mobile application transmits the virtual identification to the reader device and the system permits physical access to the facility.

9 Claims, 5 Drawing Sheets

(58) Field of Classification Search
CPC ....... E05B 2047/0014; E05B 2047/005; E05B 2047/0088; E05B 47/0002
See application file for complete search history.

(56) References Cited

U.S. PATENT DOCUMENTS

| | | |
|---|---|---|
| 2012/0068818 A1 | 3/2012 | Mizon |
| 2015/0017910 A1* | 1/2015 | Li ........................... H04B 5/45 |
| | | 455/41.1 |
| 2016/0232728 A1 | 8/2016 | Allibhoy |
| 2016/0358391 A1 | 12/2016 | Drako |
| 2017/0324751 A1 | 11/2017 | Prabhu |
| 2017/0372542 A1 | 12/2017 | Romero |
| 2018/0061155 A1 | 3/2018 | Ghorpade |
| 2019/0278955 A1 | 9/2019 | Mani |
| 2020/0092102 A1* | 3/2020 | Wang ................... H04L 63/0861 |
| 2020/0357212 A1 | 11/2020 | Frey |
| 2021/0090156 A1 | 3/2021 | Deveaux |
| 2021/0134096 A1 | 5/2021 | Pukari |
| 2021/0256788 A1 | 8/2021 | Eathakota |
| 2022/0406113 A1 | 12/2022 | Imanuel |
| 2023/0316013 A1* | 10/2023 | Craciun ............. G06K 7/10118 |
| | | 340/10.1 |

\* cited by examiner

VIRTUAL IDENTIFICATION FOR GRANTING SECURE ACCESS USING TWO FORMS OF AUTHENTICATION

FIELD

This invention relates generally to the field of identification, and more particularly, embodiments of the invention relate to virtually identifying a user to allow the user to physically access a secure location through the use of a single access device, such as a mobile device.

BACKGROUND

When a recently hired employee is given access to a place of business, the employee typically receives an access device such as an ID card or key fob to gain access to secured locations within the building and to the building itself. However, the employee may lose the ID card or key fob allowing whoever finds the access device to gain unauthorized access to the building. In addition, the employee may forget the ID card or key fob at home, requiring the employee to either borrow an access device or have to rely on other employees with the same level of security clearance to provide them with access. In a further example, the business may provide temporary access to guests that may then forget to return the access device requiring the business to have to manually reset their system to avoid the guest gaining unauthorized, further access to the building. The same scenario may arise when an employee is fired or leaves the company, but does not return the access device to the business. Accordingly, a need exists for systems and methods for allowing physical access to a secured building or facility using a mobile device that incorporates a virtual identification system.

BRIEF SUMMARY

Embodiments of the present invention address the above needs and/or achieve other advantages by providing apparatuses and methods for providing physical access to a building or facility using a mobile device that receives either biometric data or a pin code from the user to first identify the user and then a second level of identification sent to the user's mobile device such as a code, pin, RFID, which allows the user to gain entry or access into the facility.

Embodiments of the invention include a system for providing physical access to a facility. The system includes a mobile device having a first near-field communication device, the mobile device also having one or more security measures for authenticating a user's identity. The system further includes a mobile application encoded on the mobile device and configured to store and transmit a virtual identification of the user via the first near-field communication device. A reader device permits physical access to a facility. The reader device includes a second near-field communication device. The mobile application permits near-field communication between the first near-field communication device of the mobile device and the second near-field communication device of the reader device when the mobile device and the reader device are in proximity to one another. When the mobile device authenticates the user's identity using the one or more security measures, the mobile application transmits the virtual identification of the user to the reader device through near-field communication between the first near-field communication device and the second near-field communication device to grant or permit the user to physically access the facility.

According to example embodiments of the invention, a method for providing physical access to a facility includes running a web-based browser or dedicated application on a user's mobile device; requesting an identifying feature of the user through the user's mobile device, wherein the identifying feature of the user unlocks the user's mobile device and provides access to the web-based browser or dedicated application; receiving a virtual identification of the user in the web-based browser or dedicated application; storing the virtual identification of the user in the web-based browser or dedicated application; transmitting the virtual identification of the user from the web-based browser or dedicated application through radio-frequency to a reader device associated with the facility when the mobile device and the reader device are in proximity to one another; requesting authentication of the virtual identification of the user; and receiving virtual identification authentication confirmation and granting the user physical access to the facility.

Embodiments of the invention include a system include a mobile device having at least one processor, a communication interface communicatively coupled to the at least one processor, a memory device storing executable code, a first contactless communication device, one or more authentication devices, and a mobile application encoded on the mobile device. The executable code, when executed, causes the processor to store a virtual identification of the user, receive an unlock code by the one or more authentication devices, and transmit the virtual identification of the user to a second contactless communication device via the first contactless communication device.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Figure 1:
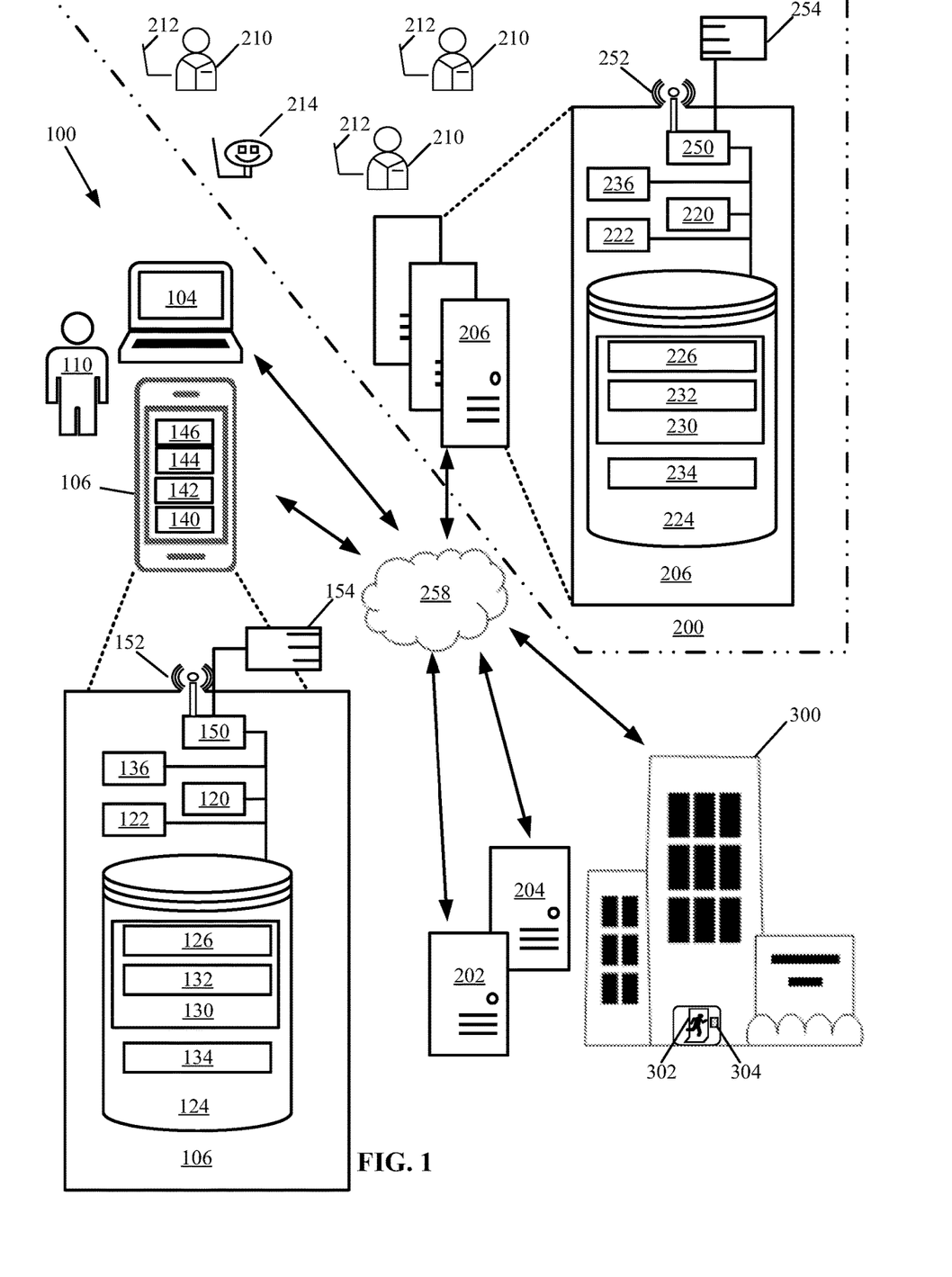
FIG. 1 illustrates an enterprise system and environment thereof for using a virtual identification to grant physical access to a secured location, in accordance with an embodiment of the present invention.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be, for example, a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, a contactless communication device, and other transceivers. In addition, GPS (Global Positioning System) may be included for navigation and location-related data exchanges, ingoing and/or outgoing. Communications may also or alternatively be conducted via the connector 154 for wired connections such as by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

In further example embodiments, one or more buildings or facilities 300 are illustrated in FIG. 1. The one or more facilities 300 include a physical point of entry 302 that is in close proximity to a reader device 304. In example embodiments, the physical point of entry 302 may be any suitable physical access point such as a door, elevator, turnstile (e.g., waist-high, full-height, optical, etc.), gate, or any other suitable access point. The physical point of entry 302 also includes a locking mechanism (not illustrated) that prevents unauthorized access or unauthorized ingress and egress, for example, a lock on a door, a control device on an elevator such that the elevator will not move to a particular floor until authorized to do so, arms or revolving doors of a turnstile that are locked until ingress or egress is authorized, a vehicle gate arm or door that will not raise or open until authorization is received. In particular embodiments, the reader device 304 may be in wired and/or wireless communication with the locking mechanism to secure ingress and egress to the physical point of entry 302. In example embodiment, the reader device 304 includes any suitable reader or input device such as a barcode scanner, RFID reader, NFC reader, QR code reader, infrared reader, keypad, BLE (Bluetooth Low Energy), etc. In various embodiments, the reader device may be in further communication with a user device associated with a security guard or other personnel that ultimately has to press a button, input a code, or physically open the point of entry for the user. With this additional level of security, the security professional can prevent undesirable or potentially dangerous entry by even an authorized user.

The user devices, referring to either or both of the mobile device 104 and computing device 106, the agent devices 212, the enterprise computing system 206, which may be one or any number centrally located or distributed, and the one or more facilities 300 are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
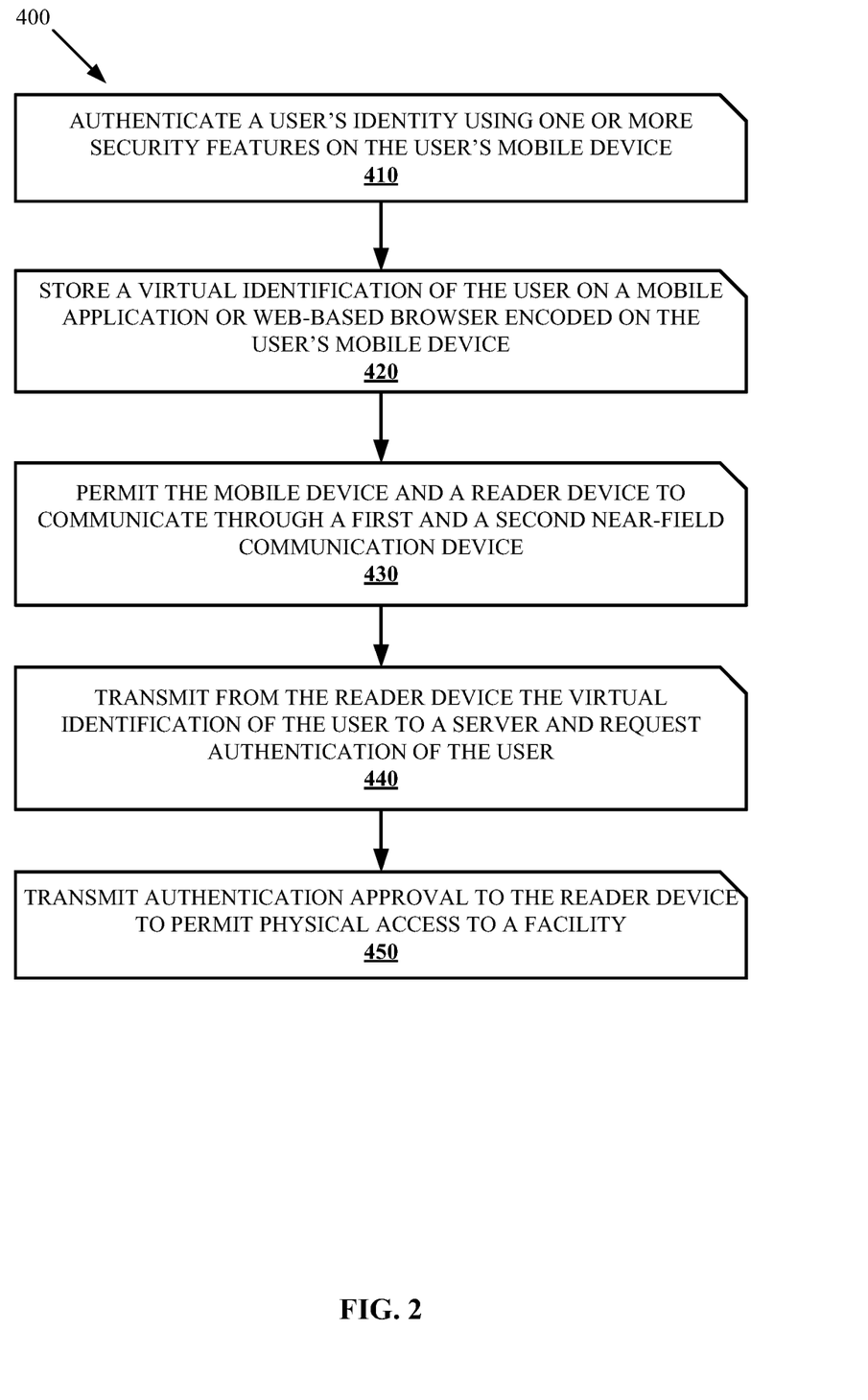
FIG. 2 is a flowchart illustrating a method for providing physical access to a facility using a virtual identification for a user, according to at least one embodiment.

FIG. 2 is a flow chart representing a method 400, according to at least one embodiment, for providing physical access to a facility using a virtual identification for a user. The method 400 is performed by a user device, which may be a mobile device or a non-mobile device, communicating with a back-end server system associated with the facility. The mobile device includes a first near-field communication device and a reader device associated with the facility includes a second near-field communication device. In various embodiments, the first and second near-field communication devices are contactless communication devices. In example embodiments, the first near-field communication device and the second near-field communication device are the same type of communication device and, thus, utilize the same type of communication protocol. In alternate embodiments, the first near-field communication device and the second near-field communication device may be different, requiring the system to translate the communication from the mobile device into a communication type recognized by the reader device. The reader device is located near a physical access point for the facility and is in wireless communication with a back-end server system to permit ingress and egress to the facility through the physical access point. The facility may have any number and types of physical access points, each having their own respective reader device.

The first step, as represented by block 410, is to authenticate the user's identity using one or more security features of the user's mobile device that allow the user to gain access to content stored or accessible from the mobile device. The one or more security features, or authentication devices, of the user's mobile device may include authenticating one or more biometric identifiers of the user, including but not limited to, a fingerprint, a thumbprint, facial recognition, iris recognition, or a combination of any of the aforementioned biometrics. In alternate embodiments, the one or more security features may include having a user enter a personal identification number into the mobile device. Alternatively, the mobile device may be secured using a password. The one or more security features allow the user to unlock the mobile device in order to use the mobile device and access programs or code stored on the mobile device.

The next step, as represented by block 420, is to store a virtual identification of the user on a mobile application or web-based browser encoded on the user's mobile device and only accessible once the mobile device has been unlocked using the one or more security features of the mobile device to authenticate the user's identity. In example embodiments, the virtual identification includes any one or more of the following identifiers for the user: (1) name; (2) phone number; (3) account number with the entity; (4) employee identification information; (5) security clearance level; and/or (6) photograph of the user. In example embodiments, the virtual identification of the user will be encrypted to protect the privacy of the user.

For example, the virtual identification may be for a customer of a bank that the bank will allow to access an ATM inside a building after the bank has closed, but that the bank would not permit to access any other area of the facility either during business hours or after hours. Thus, the virtual identification for the customer may include the customer's name, customer's account number, a photograph of the user, and a security clearance level of "ATM Area Access Only," for example. In this scenario, the bank will know exactly who entered the building and at what time in the event any issues should arise. In alternate embodiments, the user's virtual identification may include advanced identifying information including biometric authentication credentials, a personal identification number, a password, and/or a two-step verification protocol for accessing a passcode generated by a one-time password algorithm. For example, an employee of the above-referenced bank may have access to more areas than the customer, including a bank vault, requiring heightened authentication requirements and procedures.

The user's virtual identification may be stored in a user account on a web-based browser or a dedicated application having an access control platform. The user account is associated with an entity with which the user holds at least one account, product, or other relationship. The web-based browser may be navigated to a website for the entity or for a third-party security provider that is used to control physical access to the facility. The dedicated application may be a mobile application downloaded from an app store or other application hub for mobile devices. In example embodiments, the user account may only be accessed after basic or advanced authentication credentials such as a username, password, or biometric identifiers have been input and authorized by the access control platform.

The method, at step 430, then permits the mobile device and the reader device to communicate with each other through the first near-field communication device and the second near-field communication device, respectively, when the mobile device and the reader device are in proximity to one another. When in proximity, and once the mobile device has authenticated the user's identity, the mobile application transmits the stored virtual identification to the reader device through near-field communication. In alternate embodiments, any form of radio-frequency communication may occur between the mobile device and the reader device. Although described as a near-field communication device, any suitable communication device may be used to facilitate the communication between the mobile device and the reader device. For example, the communication between the mobile device and the reader device may occur through RFID, Bluetooth, BLE (Bluetooth Low Energy, QR code, WiFi, Zigbee, Z-wave, LiFi, ultrasonic, LORA, DECT, and/or Chirpacst. In alternate embodiments, the system may communicate through artificial electromagnetic field sources, or EMF.

In example embodiments, the system may create predetermined ranges including a minimum range and/or a maximum range for communications. In example forms, the predetermined range is between about 0-30 centimeters, more preferably between about 0-15 centimeters, for example, about 4-6 centimeters. In various embodiments utilizing Bluetooth technology, the predetermined maximum range may be farther than systems utilizing near-field communication. For example, the system may limit the Bluetooth connectivity maximum range to five feet.

The next step, at step 440, is for the reader device to transmit the virtual identification of the user to the back-end server system and request authentication of the user. Once the system authenticates the user, the next step, as represented by block 450 is for the reader device to permit physical access to the facility by communicating with an access control device at the physical access point of the facility where the reader device is located. For example, after receiving authentication of the user, the reader device, being in wired communication with a locking mechanism on a door, causes the locking mechanism to unlock, permitting the user to open the door and enter the facility. In an alternate example, the system may send the authentication notice that affirms the user is permitted access to the reader device, which then wirelessly communicates with a drive-up access gate having a gate arm, causing the access gate to raise the gate arm, permitting ingress or egress by the user.

Figure 3:
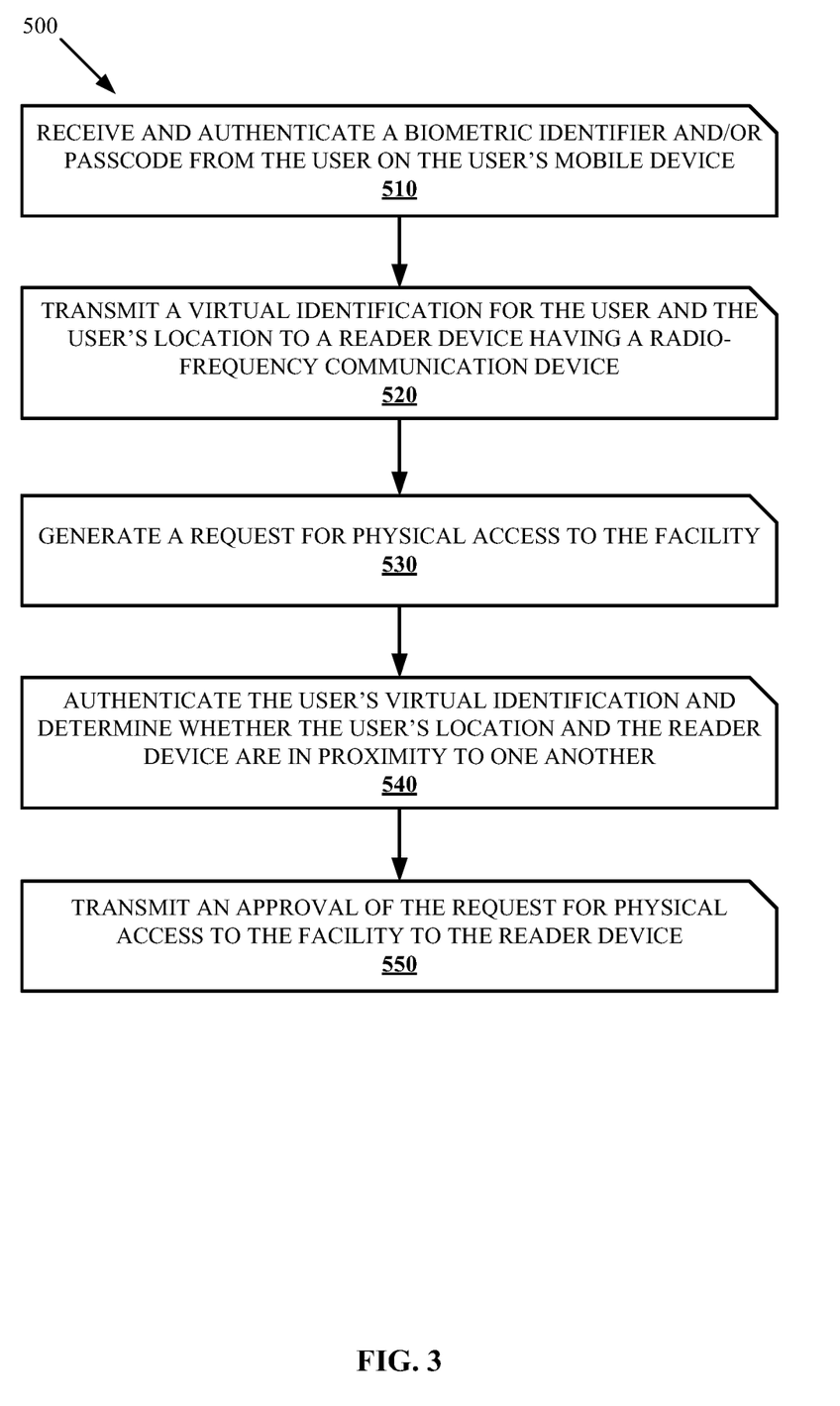
FIG. 3 is a flowchart illustrating a method for granting a user physical access to a facility for a predetermined amount of time, according to at least one embodiment.

FIG. 3 is a flowchart illustrating a method for granting a user physical access to a facility for a predetermined amount of time, according to at least one embodiment. Similar to the method described with reference to FIG. 2, the method 500 is performed by a system that includes a mobile device, a remote server, and a reader device. The remote server is in wireless communication with the reader device of an access control point associated with the facility. The access control point may be a door, gate, elevator, turnstile (e.g., waist-high, full-height, optical, etc.), or any other suitable access point. Many features of the system that performs method 500 are the same or similar to those features recited above with regard to FIG. 2. Thus, for purposes of ease of understanding and clarity, only certain features will be discussed to highlight the differences in the systems and methods of the embodiment shown in FIG. 2 as compared to the embodiment shown in FIG. 3.

The first step, as represented by block 510, is to unlock the mobile device based on an authentication of the user by the security mechanism. The mobile device, in a particular embodiment, is a smartphone associated with a user employed by an entity that conducts business within the facility. In a preferred embodiment, the mobile device has a security mechanism for unlocking the mobile device based on receiving and authenticating a biometric identifier and/or passcode from the user. The mobile device further includes a first radio-frequency communication device and a location device. The location or positioning device, for example, may be a GPS device electronically coupled to the mobile device. Additionally, the mobile device includes a web-based browser or dedicated application that may be configured to create, store, and transmit a virtual identification for the user through the first radio-frequency communication device.

The next step, as represented by block 520, is to transmit the virtual identification from the first radio-frequency communication device of the mobile device to the second radio-frequency communication device of the reader device. The user's location, based on the location positioning device determining the location of the mobile device, is also transmitted to the reader device. The transmission of the combination of the virtual identification and the user's location generates a request for physical access to the facility, as represented by block 530.

At the next step, as represented by block 540, in response to receiving the virtual identification, the user's location, and the request for physical access, the remote server authenticates the user's virtual identification and determines whether the user's location and the reader device are in proximity to one another.

The next step, as represented by block 550, is for the remote server to transmit an approval of the request for physical access to the facility through the wireless communication between the remote server and the reader device. The facility includes a physical point of entry in proximity to the reader device and a locking mechanism for preventing and permitting physical access to the facility through the point of entry. For example, the locking mechanism may be in a locked configuration to prevent physical access to the facility or may be in an unlocked configuration to permit physical access to the facility. In example embodiments, the locking mechanism is in wireless communication with the reader device. In alternate embodiments, the locking mechanism may be operatively coupled to the reader device through any suitable communication channel.

In response to receiving the approval of the request for physical access to the facility, the reader device transmits an unlock or access code to the locking mechanism such that the locking mechanism is moved to the unlocked configuration to permit physical access to the facility through the physical point of entry. In particular embodiments, when the remote server transmits the approval of the request for physical access, the server also limits the amount of time that the access code may be used to unlock the locking mechanism before the access code expires. For example, the user's access code to the facility may be limited to a predetermined amount of time (e.g., 30 seconds, 60 seconds, 90 seconds, etc.). In alternate embodiments, the approval for access may be limited to a single opening or movement of the access control point. For example, the approval will be limited to one revolution of a turnstile such that anyone following the user will not be able to follow the user into the facility and enter using the same access approval. The second user in this scenario will also need to go through the steps to request and gain access to the facility.

Figure 4A:
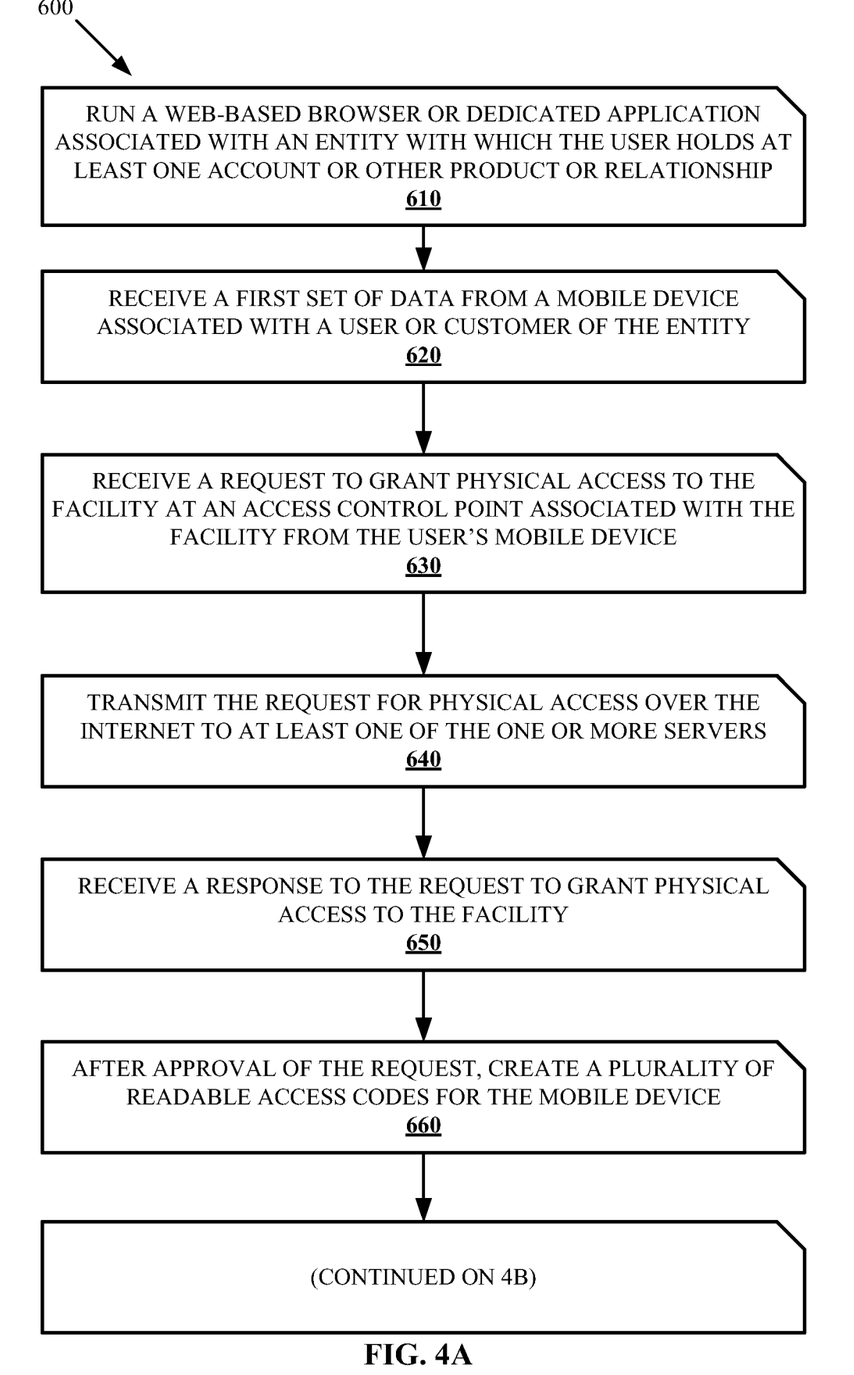
FIG. 4A is a flowchart illustrating a method for granting a user physical access to a facility using a plurality of access control devices, according to at least one embodiment.
Figure 4B:
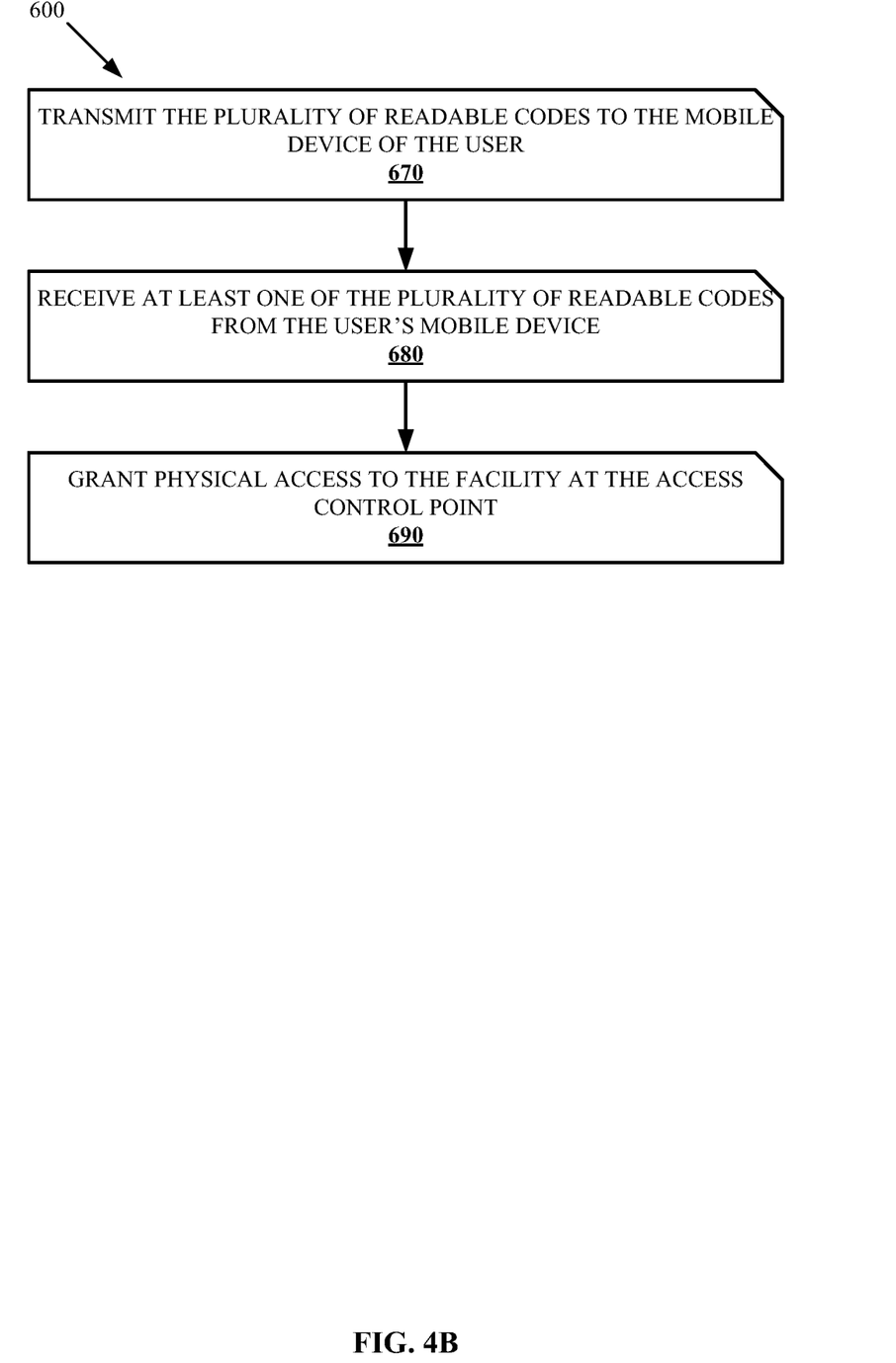
FIG. 4B is a continuation of the flowchart of FIG. 4A.

Referring now to FIGS. 4A-4B, a flowchart illustrates a method 600 for granting a user physical access to a facility using a plurality of access control devices according to example embodiments of the invention. The method 600 is performed by an access control device associated with a facility. The first step, as represented by block 610, is to run a web-based browser or dedicated application associated with an entity with which the user holds at least one account or other product or relationship. For example, the entity may be a bank and the user may be a customer or an employee of the bank. When the entity is a bank, the web-based browser is navigated to the online banking platform for the entity. The dedicated application may be a mobile application downloaded from an app store or other application hub for mobile devices.

The next step, as represented by block 620, is to receive a first set of data from a mobile device associated with a user or customer of the entity. The first set of data includes identifying information for the user. For example, the first set of data may include a username and password or other basic credentials for the user. In an alternate example, the first set of data may include any one or more of the following: (1) name; (2) phone number; (3) account number with the entity; (4) employee identification information; (5) security clearance level; (6) photograph of the user. The first set of data may be received in response to the user attempting to gain access to the facility by using their mobile device to access a web-based browser based on directions from the online banking platform (which may come from a back-end server system or another entity system), or may originate from a dedicated mobile app on the user's mobile device. The data may also be received in response to a pop-up window presented to the user when the user is in close proximity to the facility and/or the reader device of the facility.

The next step, as represented by block 630, is to receive a request to grant physical access to the facility at an access control point associated with the facility from the user's mobile device. In example embodiments, the access control point includes a first type of reader device. The system may include a single access control point, such as a door, gate, elevator, turnstile (e.g., waist-high, full-height, optical, etc.), or any other suitable access point, or alternatively there may be a plurality of access control points located at or within the facility for varying degrees or levels of security. In particular embodiments, the reader device may be a barcode scanner, RFID reader, NFC reader, QR code reader, infrared reader, keypad, BLE (Bluetooth Low Energry), etc. In various embodiments, the access control point may include one or more types of reader devices at varying locations at or within the facility. In some embodiments, the control point may include a plurality of types of reader devices at the same access control point.

For the next step, as represented by block 640, the request to grant physical access is transmitted over the Internet to at least one of the one or more servers. In example embodiments, the request includes the identifying information for the user.

The next step, as represented by block 650, is to receive a response to the request to grant physical access to the facility. In particular embodiments, the response includes whether or not the request to gain physical access was approved. In some embodiments, the request may not be approved, requiring the system and/or user to have to repeat the prior steps to receive approval.

The next step, as represented by block 660, after receiving an approved request to grant physical access, is to create a plurality of readable access codes for the mobile device associated with the user. In example embodiments, the plurality of readable access codes may be any suitable format including, but not limited to, a barcode, RFID, NFC, QR code, number for a keypad, etc.

The next step, as represented by block 670, is to transmit the plurality of readable access codes to the mobile device for use by the user to gain physical access to the facility by communicating at least one of the plurality of readable codes to the first type of reader device at the access control point.

The next step, as represented by block 680, is to receive at least one of the plurality of readable codes from the user's mobile device and, as represented by block 690, grant physical access to the facility. In example embodiments, the at least one of the plurality of readable codes will correspond to the reader device associated with the access control point. For example, a user may receive the plurality of readable access codes on a mobile application or web-based browser encoded on the user's mobile device and associated with the entity doing business at the particular facility where the user is requesting access. The user may then select the appropriate code for the particular reader device. For example, the user may select the unique QR code when presented with a QR scanner. In alternate embodiments, the system may automatically choose the correct corresponding access code based on the location and type of the reader, as determined by the one or more servers. In one embodiment, where the user's mobile device includes an near-field communication device and the access code is a unique NFC tag, the system may allow passive or active communication between the user's mobile device and the access control point reader device.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for providing physical access to a facility, the system comprising:
    at least one processor;
    a communication interface communicatively coupled to the at least one processor;
    a memory device storing executable code, wherein the executable code, when executed, causes the at least one processor to;
        facilitate an authentication process using near-field communication between a first near-field communication device of a mobile device and a second near-field communication device of a reader device when the mobile device and the reader device are in proximity to one another, the mobile device having a mobile application storing virtual identification information of a user, and the reader device being configured to permit physical access to a facility;
        authenticate, as part of the authentication process, (i) an identity of the user of the mobile device and (ii) authenticity of an access code corresponding to the second near-field device of the reader device based on automatically identifying the access code from a plurality of readable access codes, the access code corresponding to the reader device's type and location, the authenticating including receiving, via the reader device, the virtual identification information of the user and a plurality of readable access codes of the mobile device associated with the user through the near-field communication between the first near-field communication device and the second near-field communication device, the plurality of readable access codes of the mobile device associated with the user and including the access code corresponding to the second near-field device, the authenticating occurring in response to receiving, from the second near-field communication device of the reader device, the virtual identification information, the plurality of access codes, and a current time of receipt of the virtual identification information and the plurality of access codes by the second near-field device of the reader device; and
        transmit a communication to the reader device that the user has been authenticated and has authorization to access the facility at the current time to permit physical access to the facility to the user.

2. The system of claim 1, wherein the authentication process further comprises confirming authentication of a biometric identifier of the user.

3. The system of claim 1, wherein the authentication process further comprises confirming authentication of a personal identification number.

4. The system of claim 1, wherein the first near-field communication device is a passive communication near-field communication device.

5. The system of claim 1, wherein the first near-field communication device is an active communication near-field communication device.

6. The system of claim 1, wherein the virtual identification information of the user comprises a name of the user, an employee number of the user, a company name of the user, a photographic image of the user, and a security clearance of the user.

7. The system of claim 1, wherein the facility comprises at least one of a place, an amenity, and a piece of equipment.

8. The system of claim 1, wherein the first near-field communication device comprises a communication device that communicates through at least one of NFC protocol, RFID, Bluetooth, BLE, QR code, WiFi, Zigbee, Z-wave, LiFi, ultrasonic, and Chirpcast.

9. The system of claim 1, wherein the mobile device and the reader device are in proximity to one another when they are within six centimeters of each other.

* * * * *